United States Patent [19]
Jubin, Jr. et al.

[11] 3,920,766
[45] Nov. 18, 1975

[54] PRODUCTION OF ISOBUTANE FROM TERTIARY BUTYL ALCOHOL

[75] Inventors: John C. Jubin, Jr., Wallingford; Henry R. Grane, Springfield, both of Pa.

[73] Assignee: Atlantic Richfield Company, Los Angeles, Calif.

[22] Filed: Feb. 27, 1974

[21] Appl. No.: 443,643

[52] U.S. Cl. .............................................. 260/683.9
[51] Int. Cl.² ...................... C07C 9/00; C07C 11/00
[58] Field of Search...... 260/676 R, 666, 682, 683.9

[56] References Cited
UNITED STATES PATENTS

| | | | |
|---|---|---|---|
| 2,440,678 | 5/1948 | Ford et al. ...................... | 260/683.9 |
| 2,512,649 | 6/1950 | Howard et al. ................ | 260/676 R |
| 3,203,998 | 8/1965 | House et al. ................... | 260/676 R |
| 3,501,546 | 3/1970 | Dubeck et al. ................. | 260/676 R |

FOREIGN PATENTS OR APPLICATIONS

| | | | |
|---|---|---|---|
| 206,561 | 1/1967 | India ................................. | 260/676 |
| 543,327 | 2/1942 | United Kingdom................ | 260/682 |

OTHER PUBLICATIONS

"Catalytic Dehydrogenation, I Catalytic Conversion of Alcohols into Aldehydes, Paraffins and Olefins" by Elmer J. Badin, J.A.C.S., vol. 65, pp. 1809–1813 (1943).
"The Preparation of N-Heptane and 2-2-Trimethyl Pentane" Petrov et al, Chemical Institute of Academy of Science, U.S.S.R. 1936, pp. 1–13.

*Primary Examiner*—Delbert E. Gantz
*Assistant Examiner*—Juanita M. Nelson
*Attorney, Agent, or Firm*—Delbert E. McCaslin

[57] ABSTRACT

Production of isobutane by the conversion of tertiary butyl alcohol such as that contained in a reduced isobutane oxidate stream by contacting said tertiary butyl alcohol with hydrogen at elevated temperatures and pressures in the presence of a supported nickel-containing catalyst. Nearly quantitative conversions and selectivities to isobutane are obtained by proper control of reaction parameters.

9 Claims, No Drawings

PRODUCTION OF ISOBUTANE FROM TERTIARY BUTYL ALCOHOL

BACKGROUND OF THE INVENTION

In recent years a number of commercial plants have been put into operation wherein tertiary butyl hydroperoxide is used as an oxygen carrier, for example in the epoxidation of propylene to propylene oxide, with the hydroperoxide being reduced to the tertiary butyl alcohol.

Initially isobutane is oxidized thermally with molecular oxygen which produces an oxidate comprised predominantly of a mixture of tertiary butyl hydroperoxide and tertiary butyl alcohol. The oxidate is used as the oxidizing agent in the epoxidation of propylene to propylene oxide and finally after separation and purification steps there is recovered the tertiary butyl alcohol.

Some quantities of tertiary butyl alcohol are used as a gasoline additive for its octane improvement and carburetor anti-icing properties, while in other cases the alcohol has been dehydrated over alumina to give isobutylene which in turn can be used as a monomer but which currently is also being hydrogenated over a hydrogenation catalyst such as palladium to produce isobutane for recycle to the process.

The 2-stage conversion process currently being employed, i.e. dehydration of the alcohol to isobutylene followed by hydrogenation of the isobutylene to isobutane was considered necessary since it results in an essentially olefin-free isobutane product which is necessary for the initial oxidation step to achieve good yields of tertiary butyl hydroperoxide.

Although the 2-stage process which gives a product completely satisfactory for recycle, it is obvious that a single stage process which would give the same result would be superior from the standpoint of economies both with respect to yields, capital investment and operating costs. Moreover, current shortages of raw materials such as isobutane make it imperative that the make-up isobutane be minimized and that recycle isobutane be the major source of supply.

A method now has been found whereby tertiary butyl alcohol can be dehydrated and hydrogenated in a single reaction stage by passing the alcohol together with hydrogen over a catalyst which exhibits both dehydration and hydrogenation activity while simultaneously controlling the reaction parameters such that substantially quantitative conversion and selectively to isobutane is obtained.

It is known, for example, from U.S. Pat. No. 2,512,649 (1950) to Howard et al that highly branched chain hydrocarbons can be produced by copolymerizing a secondary and tertiary alcohol, hydrohalogenating the olefinic products produced thereby and thereafter methylating the hydrohalogenated olefins to produce a mixture of hydrocarbons, generally nonanes.

In U.S. Pat. No. 3,501,546 (1970) to Dubeck et al the conversion of primary alcohols to hydrocarbons is shown, the catalyst employed being palladium on titanium dioxide. The hydrocarbons produced have $n-1$ and $2n-1$ carbons respectively, where the number of carbons in the starting primary alcohol is $n$.

An article by Badin, entitled "Catalytic Conversion of Alcohols into Aldehydes, Paraffins and Olefins" in the Journal of the Americal Chemical Society, Vol. 65, pages 1809–13 (1943) shows the liquid phase nickel-catalyzed conversion of primary aliphatic alcohols into the corresponding aldehyde, an unsaturated hydrocarbon of one less carbon atom and the saturated hydrocarbon of one less carbon atom. In all cases the catalyst employed was Raney nickel and the alcohol was a primary alcohol. The steps postulated are first the conversion of the alcohol to the aldehyde with the production of 1 mole of hydrogen, deformylation of the aldehyde to the olefin (of one less carbon atom) with the production of 1 mole of carbon monoxide and 1 mole of hydrogen and finally the hydrogenation of the olefin to the corresponding saturated hydrocarbon of one less carbon atom.

The instant process differs from the foregoing art in that a different catalyst is employed, there is no polymerization, only a tertiary alcohol is used and the product is only a saturated hydrocarbon having the same number of carbon atoms as the starting alcohol.

SUMMARY OF THE INVENTION

In accordance with this invention isobutane is produced by contacting tertiary butyl alcohol with hydrogen in the presence of a supported nickel-containing catalyst at a temperature in the range of from about 450°F. to 850°F. at hydrogen partial pressures at the reactor outlet of from about 150 psi to 350 psi to convert the tertiary butyl alcohol to isobutane. The tertiary butyl alcohol can be from a reduced isobutane oxidate stream and an additional feature of the invention is the recycle of isobutane along with the fresh feed to provide better heat distribution throughout the catalyst bed.

It is an object of this invention therefore to provide a method for the conversion of tertiary butyl alcohol to isobutane in a single stage.

It is another object of this invention to provide a method for the catalytic conversion of tertiary butyl alcohol to isobutane in a single stage which gives high conversion and high selectivity to isobutane.

It is another object of this invention to provide a method for the conversion of tertiary butyl alcohol to isobutane in the presence of hyrogen and a supported nickel-containing catalyst.

It is another object of this invention to provide a method for the conversion of tertiary butyl alcohol to isobutane in the presence of hydrogen and a supported nickel-containing catalyst wherein isobutane is introduced with fresh charge as a diluent or heat sink in order to provide a means of controlling the heat distribution throughout the catalyst bed.

Other objects of this invention will be apparent from the following description of the invention and from the claims.

DESCRIPTION OF THE INVENTION

The tertiary butyl alcohol can be from any source, provided that it does not contain impurities which would poison the supported nickel catalyst; however, the present invention has particular utility in the conversion of the tertiary butyl alcohol obtained as a by-product from the propylene epoxidation process wherein initially isobutane is oxidized with molecular oxygen to produce an oxidate which is comprised of a mixture of tertiary butyl hydroperoxide and tertiary butyl alcohol in an amount ranging from about 90 to 95 weight per cent or more of the oxidate with the remainder of the oxidate being composed of small amounts of other oxidation products, such as water, methanol, acetone, methyl formate and the like. This initial oxidation of isobutane to the mixture of tertiary butyl hydroperoxide and tertiary butyl alcohol is described in numerous patents, for example U.S. Pat. No. 2,845,461 (1958) to Winkler and 3,478,108 (1969) to Grane.

This initial oxidate is used as the oxidizing agent in the epoxidation of propylene to propylene oxide in the presence of a molybdenum catalyst. This process has been widely described both in patents and in published literature. In addition several commercial plants are in operation. In the process the tertiary butyl hydroperoxide which oxidizes the propylene is reduced to tertiary butyl alcohol and as a result the effluent from the epoxidation process after removal of unreacted propylene and the propylene oxide product is composed primarily of tertiary butyl alcohol along with minor amounts of other oxidation products including some higher molecular weight materials. Thus the final tertiary butyl alcohol-containing product is a reduced isobutane oxidate.

This reduced isobutane oxide or crude tertiary butyl alcohol stream generally contains about 93 weight per cent tertiary butyl alcohol. This can be utilized as the feed to the instant process, however, since acetone and methanol comprise two of the principal impurities and since both are valuable chemicals it is preferable to fractionally distill the crude tertiary butyl alcohol product to recover these and other chemicals and to increase the tertiary butyl alcohol purity up to 96–97 weight per cent.

The catalysts which can be employed are of the supported nickel-containing type, for example, a commercial catalyst comprising nickel and molybdenum oxides supported on alumina or a nickel on kieselguhr support. These catalysts are prepared by impregnating the desired support with the desired amount of a nickel compound, or by dual or successive impregnations of the support with the nickel compound and with a compound of molybdenum, for example. Generally they are calcined but some supported nickel catalysts are commercially available wherein the nickel has been reduced to the active metal. These catalysts and their preparation are widely described in the patented art particularly that relating to hydrodesulfurization and hydrogenation processing. These catalyst give conversions under the optimum reaction conditions of this invention of 99 per cent or higher with a selectivity to isobutane of 97–98 per cent or higher.

When employing the nickel-molybdenum oxide on alumina type catalyst it is necessary to activate the catalyst by sulfiding to convert the oxides to the corresponding sulfides in accordance with conventional methods. A conventional commercial catalyst of this type contains about 3 per cent by weight of nickel oxide (NiO) and approximately 15 weight per cent molybdena ($MoO_3$) on alumina. In order to activate this catalyst it is necessary to sulfide it in accordance with conventional techniques. When catalysts of this type are used in this invention the sulfiding procedure employed was as follows:

1. the unit is purged with hydrogen at 25 psig operating pressure,
2. the unit is heated during purging to 350°–400°F.,
3. next $H_2S$ is introduced into unit along with $H_2$ giving a 10 per cent $H_2S$ gas flow,
4. sulfiding is continued until break through occurs,
5. after breakthrough as evidenced by precipitation of cadmium chloride solution the temperature is raised to operating temperature at 100°F/hour intervals,
6. when operating temperature is reached, $H_2S$ is removed from inlet gas and pure hydrogen is in service,
7. when $H_2S$ removal is completed, the operating conditions are established and liquid feed started.

Since the feed is substantially a pure material free of sulfur together with hydrogen the catalyst would quickly be reduced under operating conditions so that it would become deactivated in the conversion. It has been found that it is necessary to maintain the catalyst in a sulfided condition by the addition of sulfur in the form of a sulfur compound, either in the feed or hydrogen stream. Several methods can be employed for accomplishing this result, one being the addition of carbon disulfide by dissolving this compound in a portion of the feed stream. On a commercial scale however, a convenient method is to add hydrogen sulfide along with the hydrogen stream which is introduced into the system together with the tertiary butyl alcohol stream. The sulfur of course can be added intermittently or continuously but it is preferably added continuously and in an amount sufficient to maintain the catalyst in the sulfided condition. This has been found to be at least 50 parts per million (molar) of sulfur concentration in the total feed, i.e. the tertiary butyl alcohol, hydrogen and recycle isobutane if used. In other words, a 50 ppm molar concentration of sulfur should be maintained in the reactor gas in contact with the catalyst. Preferably higher amounts are employed in order to insure that sufficient sulfur is present at all times to keep the catalyst in the sulfided condition. Another supported nickel containing catalyst which can be used is nickel on kieselguhr the nickel being the active reduced metal. A number of these catalysts are available wherein the nickel is about 33 weight per cent or more, for example 58 weight pe cent nickel on the kieselguhr support. These catalysts do not require sulfiding but can be employed directly in the conversion process of this invention. Similar supported nickel-containing catalysts are available commercially which can be used in the process of this invention provided that those catalysts that require sulfiding be properly activated and the sulfiding maintained as described.

In carrying out the reaction, the temperatures employed can range from 450°F. to 850°F., however, it is preferred to carry out the reaction at from 500°F. to 800°F. and more preferably from 550°F. to 700°F. The lower temperatures give somewhat less conversions as will be shown hereinafter unless other reaction parameters are modified to compensate. Moreover if the catalyst deactivates over a long period of use the temperature can be increased in order to compensate for this decrease in activity until it becomes necessary to reactivate the catalyst. In reactivating the catalyst the coke, if any, may burn off in accordance with conventional procedures using a dilute oxygen containing stream in order to avoid structural damage to the catalyst and in the case of those catalysts requiring sulfiding the catalyst is again sulfided prior to use in accordance with the conventional procedure, such as that described hereinbefore. However, since in some instances little or no coke is formed on the sulfided catalyst it may only be necessary to resulfide the catalyst, using the conventional procedure described, in order to reactivate the catalyst.

In order to obtain the desired dehydration and hydrogenation reactions it is necessary to maintain a hydrogen partial pressure in the range of from about 150 psi to 350 psi measured at the outlet of the reactor. In general a mole ratio of hydrogen to tertiary butyl alcohol of 3:1 initially is preferred so that a total operating pressure of about 300 psig to 700 psig is used. Higher mole ratios of hydrogen to tertiary butyl alcohol, for example 5:1 can be used but these only increase the volume of gas being passed over the catalysts and of course increase capital and operating costs. Lower mole ratios in general adversely effect the conversion obtained and since it is desired to maximize conversion and selectivity such lower mole ratios are not preferred.

The weight hourly space velocity, (WHSV) i.e. pounds of liquid feed (tertiary butyl alcohol feed) per pound of catalyst per hour can vary over a very wide range for example from 2 to 20. At the low end of the range, of course, exceedingly high conversions are obtained while at the high end of the range the conversions are greatly lowered because the contact with the catalysts is greatly reduced. Consequently a more preferred range is from 4 to 10 WHSV and a most preferred range is from 4.5 to 9. This range provides the desired high conversion and selectivity together with a reasonable throughput.

The hydrogen employed can be pure although commercially it can be admixed with minor amounts of the lower molecular weight paraffins, i.e. methane, for example. Such hydrogen although it contains only minor amounts of such impurities is considerably cheaper as a commercial source. It has been found for example that a mixture of 50 mole per cent hydrogen and a 50 mole per cent methane can be utilized in the process of this invention. However, it is preferable that the impurities in the hydrogen be as low as possible because of the dilution effect, i.e. diluting the hydrogen requires higher operating pressures to maintain the desired hydrogen partial pressure and therefore increase the capital and operating costs.

While the exact mechanism is of the conversion of tertiary butyl alcohol to isobutane in the instant invention is not known with certainty, it is theorized from the observation of the described reaction parameters that the alcohol is first dehydrated to isobutylene which is then hydrogenated to isobutane. The dehydration reaction is rapid and endothermic while the hydrogenation reaction is slower and exothermic. It is the unexpected and surprising discovery of this invention, therefore, that catalyst and reaction parameters can be so balanced that the dehydration endothermic reaction is followed immediately and concurrently by the exothermic reaction. Thus the temperature is more evenly balanced toward the inlet end of the reaction zone and the production of products other than isobutane is substantially prevented. Hence the process has the completely unexpected ability to achieve the high (99 to 100 per cent) conversion of the alcohol with the correspondingly high selectivity for producing isobutane all within a single stage reaction zone. In other words the process has the unexpected ability to convert tertiary butyl alcohol substantially quantitatively to isobutane in a single stage.

The overall reaction is exothermic and consequently it is desirable to provide some means for removing heat as well as to distribute it more evenly in the catalyst bed. Tubular reactors are frequently used for reactions of this type such reactors being provided with cooling means, however, in the instant process it has been found that by using a portion of the isobutane product as recycle the isobutane acts as a diluent and a heat sink thereby preventing heat build up in the reactor and at the same time distributing the heat more evenly throughout the reactor. Obviously other gases which are inert under the reaction conditions could be used, for example additional hydrogen or other hydrocarbon. Since however, isobutane is readily available as a product and can be recycled without loss it is the preferred diluent or heat sink medium. The amount, of course, can be varied with the other reaction parameters, however, in general a 3:1 mole ratio of isobutane to tertiary butyl alcohol provides the desired temperature control. It should be noted however, that depending upon the reactor design and other processing variables larger or smaller amounts of isobutane might serve the desired purpose. It is important, however, that irrespective of the mole ratio of isobutane used that the mole ratio of hydrogen to alcohol and the partial pressure of hydrogen in the reactor be maintained within the ranges set forth hereinbefore. Utilizing isobutane as a diluent will of course increase the quantity of gases flowing over the catalyst and thus the total operating pressure may be required to be higher. However, the temperature and weight hourly space velocity should be maintained within the ranges set forth.

Except as noted, the data which follow were obtained using an alumina supported nickel-molybdenum catalyst. This catalyst is sold commercially under the tradename AERO catalysts and the particular catalyst employed is designated HDS-3A. The composition of this catalyst is 3.2 weight per cent nickel oxide (NiO), typically, and may range from 3.0 to 4.0; molybdena (MoO$_3$) 15.1 weight per cent, typically, with a range of from 14.5 to 16.0; sodium oxide (Na$_2$O) 0.02 weight per cent, typically, 0.04 maximum; Fe 0.04 weight per cent, typically, 0.05 maximum; SO$_4$ 0.3 weight per cent, typically; SiO$_2$ 0.1 weight per cent, typically and Loss on Inigition 1.4 weight per cent, typically, with 2.0 weight per cent maximum. The HDS-3A catalyst is a 1/16 inch diameter extrudate and has an apparent bulk density in pounds per cubic foot of 40, typically, with a range of from 38 to 43. The average diameter in inches is 0.07, typically, with a range of from 0.050 to 0.075. The catalyst has a typical pore volume of 0.6 cc/gram and a typical surface area of 180 square meters/gram. The catalyst was sulfided utilizing the method set forth hereinbefore. The reactor used for all runs was a standard high pressure reactor, ⅞ inch inside diameter with 15 ½ inch spiral preheat coil, an 8 inch catalyst bed and the remaining 10 inch as spacers. Each catalyst was loaded by mixing 5.0 grams of catalyst with 20 grams of inert tabular alumina and making 4 batches. Each batch was charged to the reactor separately to give a total of 20 grams of active catalyst. The liquid feed was preheated essentially to reaction temperature and thereafter admixed with hydrogen and introduced into the reactor packed with the catalyst. The tertiary butyl alcohol employed was the purified material and had the following composition as set forth in Table I.

TABLE I

| Component | Wt.% |
|---|---|
| Tertiary butyl alcohol | 96.5 |
| Water | 2.2 |
| Acetone | 0.7 |

TABLE I-continued

| Component | Wt.% |
|---|---|
| Others | 0.6 |

As a result of a large number of runs, each of from 8 to 12 hours duration in which the reaction parameters were varied separately over relatively wide ranges, the following correlations were developed. These correlations are set forth as Examples I to IV but it is to be understood they are correlations developed from actual runs but are not the actual run data. The actual run data are in excellent agreement with the correlations and such correlations are not extrapolations.

EXAMPLE I

EFFECT OF TEMPERATURE ON CONVERSION

With the sulfided HDS-3A catalyst, the purified tertiary butyl alcohol feed, at 4.5 weight hourly space velocity, 225 psi partial pressure of hydrogen (3:1 mole ratio hydrogen to alcohol, no recycle), 450 psig total operating pressure with 50 ppm molar concentration of sulfur added as $CS_2$ based on the moles of total feed at an average temperature of 450°F., the conversion is 60 per cent while at an average temperature of 650°F. the conversion is 99.9 per cent. Conversion is, in all cases, determined on the basis of the non-aqueous portion of the product and is expressed as 100 per cent minus the weight per cent isobutylene, thus since in nearly all cases dehydration of the tertiary butyl alcohol to isobutylene is substantially complete, conversion is a measure of the degree of hydrogenation of the isobutylene to isobutane. Inlet temperatures as high as 825°F. gave substantially quantitative conversions. However, these high temperatures are less preferred because of the possibility of deactivating the catalyst.

EXAMPLE II

EFFECT OF HYDROGEN PARTIAL PRESSURE ON CONVERSION

With the sulfided HDS-3A catalyst, the purified tertiary butyl alcohol stream, a 4.5 weight hourly space velocity, an average temperature of 550°F. and a 50 ppm molar concentration of sulfur based on the moles of total feed, if the hydrogen partial pressure at the outlet of the reactor is 100 psi, there is obtained a conversion of only 55 per cent, whereas if the hydrogen partial pressure at the outlet of the reactor is 300 psi, a conversion of 99.6 per cent is obtained.

EXAMPLE III

EFFECT OF WEIGHT HOURLY SPACE VELOCITY ON CONVERSION

With the sulfided HDS-3A catalyst, the purified tertiary butyl alcohol stream, an average temperature of 615°F., 50 ppm molar concentration of sulfur based on the moles of total feed, and a 225 psi hydrogen partial pressure at the reactor outlet, a weight hourly space velocity of 2 will give a conversion of 99.9 per cent while at 10 the conversion is 90 per cent.

EXAMPLE IV

EFFECT OF MAINTAINING SULFUR IN THE FEED

With the sulfided HDS-3A catalyst, an average temperature of 550°F., a 4.5 weight hourly space velocity, a 225 psi hydrogen partial pressure at the reactor outlet, and with the purified tertiary butyl alcohol feed, the effect of the molar concentration of sulfur in parts per million molar based on the moles of total feed at the 10 parts per million level is a conversion of only 45 per cent, while at the 50 parts per million level, a conversion of 96 per cent is obtained.

It was found from the foregoing correlations that reaction temperatures of from 450°F. to 850°F. can be employed, but that it is preferable to use temperatures in the range of 550°F. to 700°F. Likewise it was found that hydrogen partial pressures are preferably in the range of from 150 psi to 350 psi at the outlet of the reactor, i.e. generally a hydrogen to tertiary butyl alcohol mole ratio of about 3:1 although this can be varied to give the desired partial pressure, with hydrogen partial pressures at the high end of the range being required when reaction temperatures are at the low end of the temperature range. In addition a weight hourly space velocity of 4 to 10 is satisfactory however, from 4.5 to 9 is preferred, utilizing optimum temperatures and hydrogen partial pressures. The data shown in Example IV demonstrate that if a sulfided catalyst is being employed it is necessary to utilize a minimum of about 50 ppm molar concentration of sulfur based on the moles of total feed in order to maintain the catalyst in the sulfided state. While 50 ppm molar concentration is the preferred minimum, amounts ranging up to 200 ppm molar concentration of sulfur based on moles of total feed or more also can be used, but the optimum concentration is that required to maintain the catalyst in the sulfided state, and larger amounts merely add to the cost of the process. For supported nickel catalysts not requiring sulfiding to be in the active state, no sulfur should be used in the feed and the described tertiary butyl alcohol streams are sulfur-free.

EXAMPLE V

In order to determine if the crude tertiary butyl alcohol stream could be utilized as a charge stock to the process, runs were made on the HDS-3A catalyst sulfided as described and also over a commercial nickel (about 33 weight per cent, reduced and activated) on kieselguhr. The crude tertiary butyl alcohol stream was that obtained from the described propylene epoxidation process after removal of product propylene oxide, unreacted propylene, unreacted tertiary butyl hydroperoxide and most of the heavier compounds. Its composition is shown in Table II.

TABLE II

| Component | Wt. % |
|---|---|
| Tertiary butyl alcohol | 93.20 |
| Water | 0.63 |
| Acetone | 3.60 |
| Ditertiary butyl peroxide | 0.25 |
| Methyl ethyl ketone | 0.35 |
| Methanol | 0.82 |
| Others | 1.15 |

The runs on this feed were carried out at average temperatures of about 600°F., 450 psig total pressure, 3 moles of hydrogen per mole of liquid feed and 4.5 WHSV. With the sulfided catalyst, 50 ppm of S as $CS_2$ was added with the feed. Conversions of the tertiary butyl alcohol in the 99+ weight per cent range were obtained for both catalysts.

EXAMPLE VI

Two runs were made on the purified tertiary butyl alcohol feed using, respectively, a nominal 33 weight per cent activated nickel on kieselguhr catalyst and a 58 weight per cent activated nickel on kieselguhr catalyst. The reaction conditions employed were temperatures in the 600°F.–650°F. range, 450 psig total pressure, 3 moles of hydrogen per mole of tertiary butyl alcohol feed and a 4.5 WHSV. No sulfiding was employed nor was any sulfur added with the feed. Both catalysts gave excellent conversions, however, both gave more cracking to lighter gases than was found with the sulfided nickel-molybdenum on alumina catalyst. The 58 per cent nickel catalyst gave more cracking than the 33 per cent nickel catalyst. The duration of the runs were approximately 100 hours.

EXAMPLE VII

A life test run was made on the sulfided nickelmolybdenum on alumina catalyst (HDS-3A) using the purified tertiary butyl alcohol feed (96.5 weight per cent tertiary butyl alcohol; 2.2 weight per cent water, 0.7 weight per cent acetone; and 0.6 weight per cent other oxygenated compounds). The reaction conditions employed were 640°F. total pressure 450 psig, hydrogen partial pressure at the reactor outlet 225 psi, hydrogen to tertiary butyl alcohol mole ratio at inlet 3:1, at outlet 2:1, weight hourly space velocity 4.5 and 50 ppm molar concentration of sulfur in the total feed to the reactor. After more than 700 hours on stream there was still a 99 per cent conversion of tertiary butyl alcohol to isobutane.

EXAMPLE VIII

An HDS-3A catalyst that had been used for 386 hours in the conversion of tertiary butyl alcohol to isobutane under a wide variety of processing conditions began to show deactivation as measured by an increase in the production of compounds heavier than isobutane. The catalyst was then resulfided in the reactor using the standard procedure set forth hereinbefore. When put back on stream it gave again a 99 per cent conversion of tertiary butyl alcohol to isobutane with a return to the low production of the heavier compounds demonstrating that such a procedure can be employed to reactivate the catalyst.

EXAMPLE IX

In order to demonstrate that recycle isobutane could be employed to control temperatures in the reactor a life test run was carried out wherein 3 moles of isobutane per mole of tertiary butyl alcohol feed was recycled. The weight hourly space velocities required to obtain the 99 per cent conversions are, in general in the same range as for the undiluted tertiary butyl alcohol-hydrocarbon stream, however, in this run the weight of the isobutane has to be included. The same 99+ per cent conversion was achieved together with the desired temperature control in the reactor. It will be understood that with other reactor designs, other recycle ratios can be used to achieve the desired result.

The foregoing results demonstrate that supported nickel catalysts can be used to produce isobutane from tertiary butyl alcohol such as that contained in a reduced isobutane oxidate to give substantially quantitative conversions of the tertiary butyl alcohol to isobutane. The interrelationships of the process variables have been shown. A method of recycle to control reaction temperatures has been demonstrated as well as the fact that long catalyst life can be expected and in the case of sulfided type catalysts the activity can be maintained by sulfur addition with the feed. Moreover, it has been found that catalyst deactivation can be compensated for by gradually increasing the severity of the reaction conditions such as increasing the temperature, lowering the space velocity and the like and finally in the case of sulfided catalysts, the catalyst can be reactivated in situ by resulfiding.

We claim:

1. A method for preparing isobutane which comprises contacting tertiary butyl alcohol at a temperature in the range of from 450°F. to 850°F. with hydrogen at a partial pressure of from 150 psi to 350 psi at the reactor outlet, in the presence of a supported nickel metal or supported sulfided nickel-molybdem catalyst.

2. The method according to claim 1 wherein said catalyst is sulfided nickel-molybdenum on alumina.

3. The method according to claim 1 wherein said catalyst is nickel on kieselguhr.

4. The method according to claim 1 wherein said contacting is carried out at a weight hourly space velocity of from 4 to 10 as pounds of tertiary butyl alcohol feed per pound of catalyst per hour.

5. The method according to claim 4 wherein the catalyst is sulfided nickel-molybdenum on alumina and there is introduced with said tertiary butyl alcohol feed stream at least 50 ppm molar concentration of sulfur based on the total reactor feed stream.

6. The method according to claim 4 wherein said catalyst is nickel on kieselguhr.

7. The method according to claim 1 wherein said tertiary butyl alcohol is contained in a reduced isobutane oxidate.

8. The method according to claim 1 wherein isobutane is recycled together with said tertiary butyl alcohol and hydrogen into contact with said catalyst.

9. The method according to claim 8 wherein the mole ratio of isobutane recycle to fresh feed is about 3:1.

* * * * *